US010037517B1

(12) United States Patent
Chi et al.

(10) Patent No.: US 10,037,517 B1
(45) Date of Patent: Jul. 31, 2018

(54) RISK MANAGEMENT IN ONLINE AND OFFLINE TRANSACTIONS

(71) Applicant: Square, Inc., San Francisco, CA (US)

(72) Inventors: Yun Chi, Monte Sereno, CA (US); Naeem Ishaq, San Francisco, CA (US); Nathan McCauley, San Francisco, CA (US); Rong Yan, Palo Alto, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/578,765

(22) Filed: Dec. 22, 2014

(51) Int. Cl.
| | |
|---|---|
| G06Q 20/20 | (2012.01) |
| G06Q 30/06 | (2012.01) |
| G07G 1/00 | (2006.01) |
| G07G 1/01 | (2006.01) |
| G07G 1/12 | (2006.01) |
| G06Q 20/40 | (2012.01) |

(52) U.S. Cl.
CPC ......... *G06Q 20/20* (2013.01); *G06Q 20/4016* (2013.01); *G07G 1/0009* (2013.01); *G07G 1/0036* (2013.01); *G07G 1/01* (2013.01); *G07G 1/12* (2013.01)

(58) Field of Classification Search
USPC .................................. 705/14.66, 39; 726/25
See application file for complete search history.

(56) References Cited

U.S. PATENT DOCUMENTS

| | | | |
|---|---|---|---|
| 7,707,089 B1 | 4/2010 | Barton et al. | |
| 7,752,135 B2 | 7/2010 | Brown et al. | |
| 8,499,355 B1 * | 7/2013 | Goncharov | G06F 21/44 |
| | | | 726/25 |
| 8,635,117 B1 | 1/2014 | Acuna-Rohter | |
| 8,990,121 B1 | 3/2015 | Guise et al. | |
| 9,569,767 B1 | 2/2017 | Lewis et al. | |
| 2003/0112942 A1 | 6/2003 | Brown et al. | |
| 2007/0150387 A1 | 6/2007 | Seubert et al. | |
| 2008/0035725 A1 | 2/2008 | Jambunathan et al. | |

(Continued)

OTHER PUBLICATIONS

Non-Final Office Action dated Jul. 8, 2016, for U.S. Appl. No. 15/087,581, of Quigley, O.S.C., et al., filed Mar. 31, 2016.

(Continued)

*Primary Examiner* — Hajime Rojas
*Assistant Examiner* — Reva R Danzig
(74) *Attorney, Agent, or Firm* — Lee & Hayes, PLLC (57) ABSTRACT

Techniques and arrangements for managing risk of fraudulent transactions made by a point-of-sale (POS) device operating in an online and an offline mode. In some instances, a payment service may maintain a merchant profile with a list of merchant specific criteria. The payment service may encrypt and send the merchant specific criteria to the POS device associated with the merchant. The encrypted data may include a list of payment instruments used in previous successful transactions, customer transaction histories, and other customer information. The POS device may determine, upon receiving a payment instrument identifier in a transaction, whether the payment instrument has been used in a previous successful transaction. If the POS device determines the payment instrument has been used, it may process the transaction. If not, the POS device may warn the merchant that the transaction is a high-risk transaction.

20 Claims, 6 Drawing Sheets

(56) References Cited

U.S. PATENT DOCUMENTS

| | | | |
|---|---|---|---|
| 2008/0275760 A1* | 11/2008 | Easterly | G06Q 20/10 705/39 |
| 2009/0094126 A1 | 4/2009 | Killian et al. | |
| 2010/0332400 A1 | 12/2010 | Etchegoyen | |
| 2011/0153438 A1 | 6/2011 | Dragt | |
| 2012/0030116 A1 | 2/2012 | Shirey et al. | |
| 2012/0084203 A1 | 4/2012 | Mehew et al. | |
| 2012/0330840 A1 | 12/2012 | Stinchcombe | |
| 2013/0189953 A1 | 7/2013 | Mathews | |
| 2013/0246187 A1* | 9/2013 | Chau | G06Q 30/0222 705/14.66 |
| 2014/0172700 A1 | 6/2014 | Teuwen et al. | |
| 2014/0279518 A1 | 9/2014 | Acuna-Rohter | |
| 2015/0206416 A1 | 7/2015 | Marra et al. | |
| 2016/0110718 A1* | 4/2016 | Jajara | G06Q 20/322 705/44 |

OTHER PUBLICATIONS

Advisory Action dated Mar. 3, 2017, for U.S. Appl. No. 15/087,581, of Quigley, O.S.C., et al., filed Mar. 31, 2016.
"Advancing Payment Security: MasterCard Contactless Security Overview," www.mastercard.com, retrieved from Internet URL: https://www.mastercard.com/contactless/doc/MasterCardContactless_SecurityFactSheet_2015.pdf, on Jun. 12, 2017, pp. 1-4.
Non-Final Office Action dated Jan. 2, 2015, for U.S. Appl. No. 14/271,379, of Lewis, J., et al., filed May 6, 2014.
Final Office Action dated Jun. 26, 2015, for U.S. Appl. No. 14/271,379, of Lewis, J., et al., filed May 6, 2014.
Non-Final Office Action dated Sep. 11, 2015, for U.S. Appl. No. 14/271,368, of Lewis, J., et al., filed May 6, 2014.
Non-Final Office Action dated Jan. 20, 2016, for U.S. Appl. No. 14/271,368, of Lewis, J., et al., filed May 6, 2014.
Non-Final Office Action dated Mar. 31, 2016, for U.S. Appl. No. 14/271,379, of Lewis, J., et al., filed May 6, 2014.
Non-Final Office Action dailed Jul. 5, 2016, for U.S. Appl. No. 14/271,350, of Lewis, J., et al., filed May 6, 2014.
Final Office Action dated Jul. 29, 2016, for U.S. Appl. No. 14/271,368, of Lewis, J., et al., filed May 6, 2014.
Final Office Action dated Oct. 6, 2016, for U.S. Appl. No. 14/271,379, of Lewis, J., et al., filed May 6, 2014.
Notice of Allowance dated Oct. 13, 2016, for U.S. Appl. No. 14/271,368, of Lewis, J., et al., filed May 6, 2014.
Advisory Action dated Dec. 29, 2016, for U.S. Appl. No. 14/271,379, of Lewis, J., et al., filed May 6, 2014.
Final Office Action dated Jan. 18, 2017, for U.S. Appl. No. 14/271,350, of Lewis, J., et al., filed May 6, 2014.
Notice of Allowance dated Jun. 26, 2017, for U.S. Appl. No. 15/087,581, of Quigley, O.S.C., et al., filed Mar. 31, 2016.
Notice of Allowance dated Sep. 18, 2017, for U.S. Appl. No. 14/271,379, of Lewis, J., et al., filed May 6, 2014.
Final Office Action dated Dec. 23, 2016, for U.S. Appl. No. 15/087,581, of Quigley, O.S.C., et al., filed Mar. 31, 2016.

* cited by examiner

RISK MANAGEMENT IN ONLINE AND OFFLINE TRANSACTIONS

BACKGROUND

In today's commerce, merchants often utilize an array of different point-of-sale (POS) devices, including mobile POS devices. Merchants may use these mobile POS devices to engage in transactions with customers at different locations. For example, a barista may use a mobile POS device to charge a customer for a cappuccino. In another example, a food truck may use a mobile POS device to charge a customer for lunch. The mobile POS devices are configured to operate in either an online mode or an offline mode. While in the online mode, the mobile POS device transmits transaction information to and from third parties over the internet at the time of the transaction. In the online mode, the merchant using the POS device knows if a transaction is successful (i.e., if a card is approved) prior to the customer departing the store. Therefore, there is generally little risk in the merchant losing money while operating in the online mode. While in the offline mode, however, because a merchant does not know whether a payment instrument will be approved until well after the customer has left the merchant, the merchant may risk an unsuccessful transaction.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Some implementations described herein include techniques and arrangements for managing the risk of fraudulent transactions made by a point-of-sale (POS) device operating in an online and an offline mode. In some instances, a payment service may provide the POS device with up-to-date encrypted data associated with payment instrument identifiers. The encrypted data may include transactional data, such as whether an issuing bank or a card payment network (e.g., MasterCard®, VISA®, etc.) associated with the payment instrument has previously declined the payment instrument, customer shopping history (i.e., returning customer, frequency of transactions, amount spent on last transaction, amount spent for all transactions, member of a shopping reward program, etc.), customer information (i.e., name, address, income, etc.), and any other information which may be desirable to the merchant. In some instances, the payment service may send encrypted data in one or more bloom filters with one or more hash functions.

The payment service may maintain a merchant profile with a list of merchant specific criteria. In some instances, the merchant may designate the criteria, and may update the merchant profile periodically. For example, one merchant may want to know if a customer is a returning customer, if the customer has purchased over $1000 in goods from the merchant, and if the customer is a member of a loyalty program sponsored by the merchant. Another merchant, on the other hand, may only want to know if a bank or payment network has previously declined the payment instrument. Additionally or alternatively, the payment service may provide a standard set of criteria for merchants including at least whether the payment instrument has previously been declined.

To conduct a transaction, an operator of a POS device—or "merchant"—may receive a payment instrument from a customer to pay for a good or service that the customer receives from the merchant. The merchant may then input an identifier associated with the payment instrument into a POS device by, for example, swiping the payment instrument, typing in a number of the payment instrument, or the like. When the POS device is operating in an online mode, the POS device sends transaction data (i.e., date, time, amount of the transaction, item(s) purchased, etc.) to a payment service. Responsive to receiving the transaction data, the payment service may forward the transaction data to a bank or network service for authorization of the payment instrument, and may update the merchant profile with the transaction data. In some instances, the POS device sends this information to the payment service substantially contemporaneously with the POS device receiving the identifier of the payment instrument. Usually after a short delay, the POS device may receive an indication of whether the payment instrument has been approved or declined for an amount of the transaction (i.e., a cost of the good or service).

Generally, the risk of fraudulent transactions is low when operating in the online mode based on rapid approval notification. However, certain situations, such as when a particular bank or payment network is temporarily unavailable, may result in increased delays. The delays may inconvenience the merchant, the customer desiring the transaction, and other customers waiting in line. In such situations, the merchant may use the risk management system stored on the POS device to avoid inconveniencing customers while also mitigating the risk of a fraudulent transaction.

Responsive to the merchant entering the payment instrument identifier, the POS device may compare the payment instrument identifier to the encrypted data stored locally on the POS device. The POS device may inform the merchant, with little or no delay, if the payment instrument is associated with a previous successful transaction (i.e., if the customer is a trusted customer). Armed with that information, the merchant may be willing to proceed with the transaction prior to receiving official payment approval, thereby decreasing the wait time and enhancing the shopping experience for customers, while also maintaining a low risk of a fraudulent transaction.

Additionally, the merchant may benefit from having returning customer information on the POS device. For example, the encrypted data may include additional customer information, as designated in the merchant profile. For example, responsive to entering the payment instrument identifier, the POS device may inform the merchant of the customer membership in a loyalty program. Therefore, while the customer awaits approval notification, the merchant may bestow upon the customer a loyalty gift.

Typically, online POS device transactions are relatively low risk. However, the offline mode of the POS device presents a greater risk of fraudulent transactions. When the POS device operates in the offline mode, the POS device locally stores the payment instrument identifier and the transaction data for later sending to the payment service after the POS device transitions back into the online mode. POS devices of this nature may transition to the offline mode when the device loses network connectivity (e.g., due to being at a location that lacks network connectivity) or in response to an operator manually transitioning to the offline mode using a merchant application executing on the device. Therefore, the merchant may not know if the payment network or bank will approve the payment until long after the transaction is complete. If not, the merchant may not be able to recover the cost of the goods.

Traditionally, the merchant must hope that the payment network or bank will approve each transaction made while in the offline mode. However, with the risk management process described herein, the merchant may decrease the risk of fraudulent transactions while operating the POS device in the offline mode.

Responsive to the merchant entering a payment instrument identifier, the POS device may compare the payment instrument identifier to the encrypted data stored in the POS device. If the POS device determines a match with previous successful transactions, the POS device may know that the customer is a trusted customer, and the POS device may approve the transaction. Additionally, the POS device may provide the merchant with other pertinent information regarding the customer. For example, the POS device may inform the merchant that the customer is a platinum member of a merchant loyalty program, thereby approving the customer for a special discount.

Conversely, if the POS device determines there is no match, the POS device may know that the customer is not a trusted customer. Responsive to determining that there is no match, the POS device may warn the merchant to be wary of processing the transaction, and may provide the merchant with the option to proceed with, or cancel, the transaction. In some instances, the POS device may also verify that the payment instrument does not match any payment instrument identifiers on a blacklist (e.g. stolen cards, frequently denied cards, etc.).

When the POS device transitions from the offline mode to the online mode, the POS device sends, to the payment service, all of the transaction data it has stored. Responsive to receiving the transaction data, the payment service may request approval for the transactions that occurred while in the offline mode. The payment service may also update the merchant profile with the transaction information, and add new trusted customers and/or customer information for approved and declined payment instruments.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

Figure 1A:
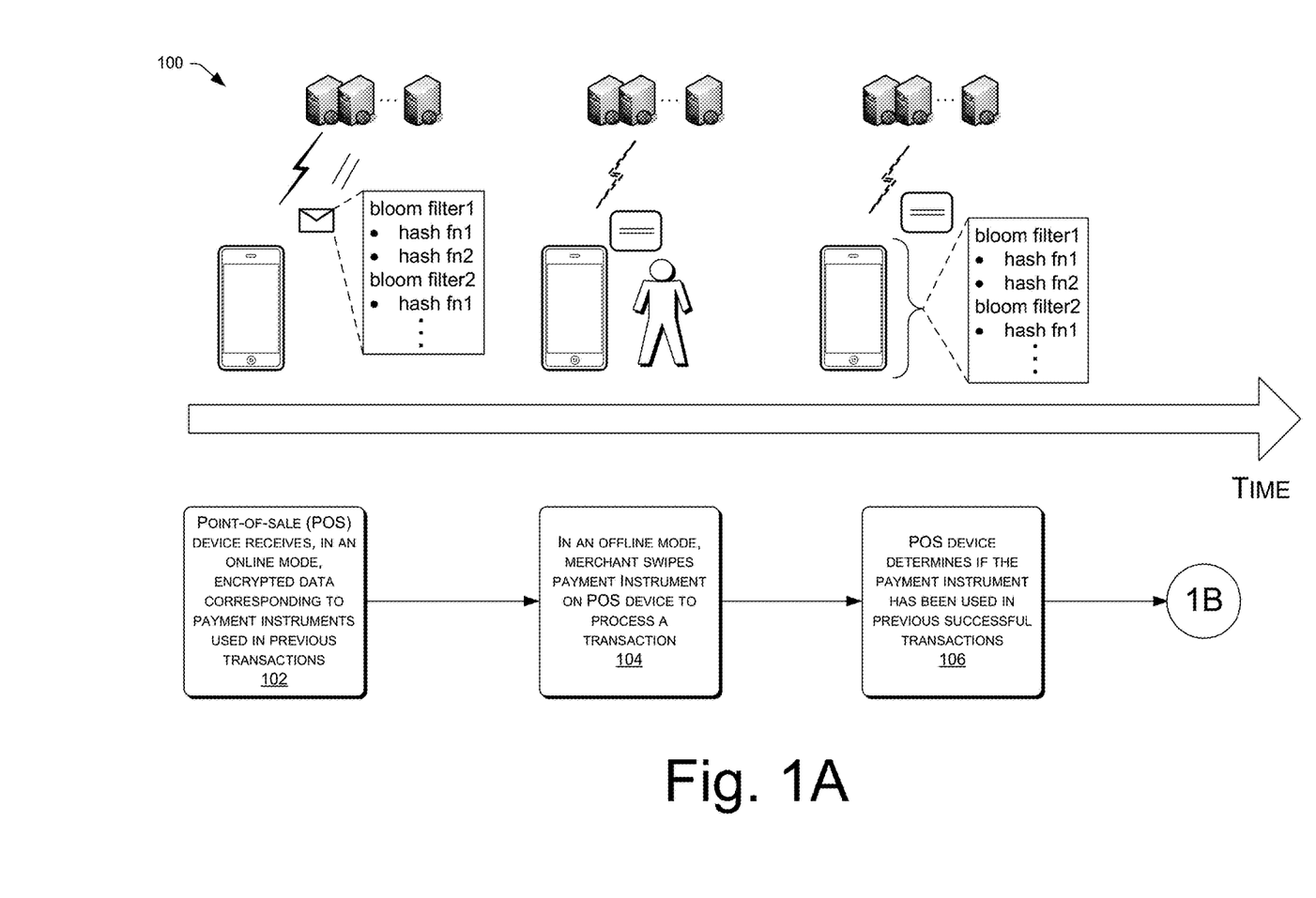
FIGS. 1A-B collectively illustrate a process for risk management in processing transactions occurring on a point-of-sale (POS) device when the device is in an offline mode.
Figure 1B:
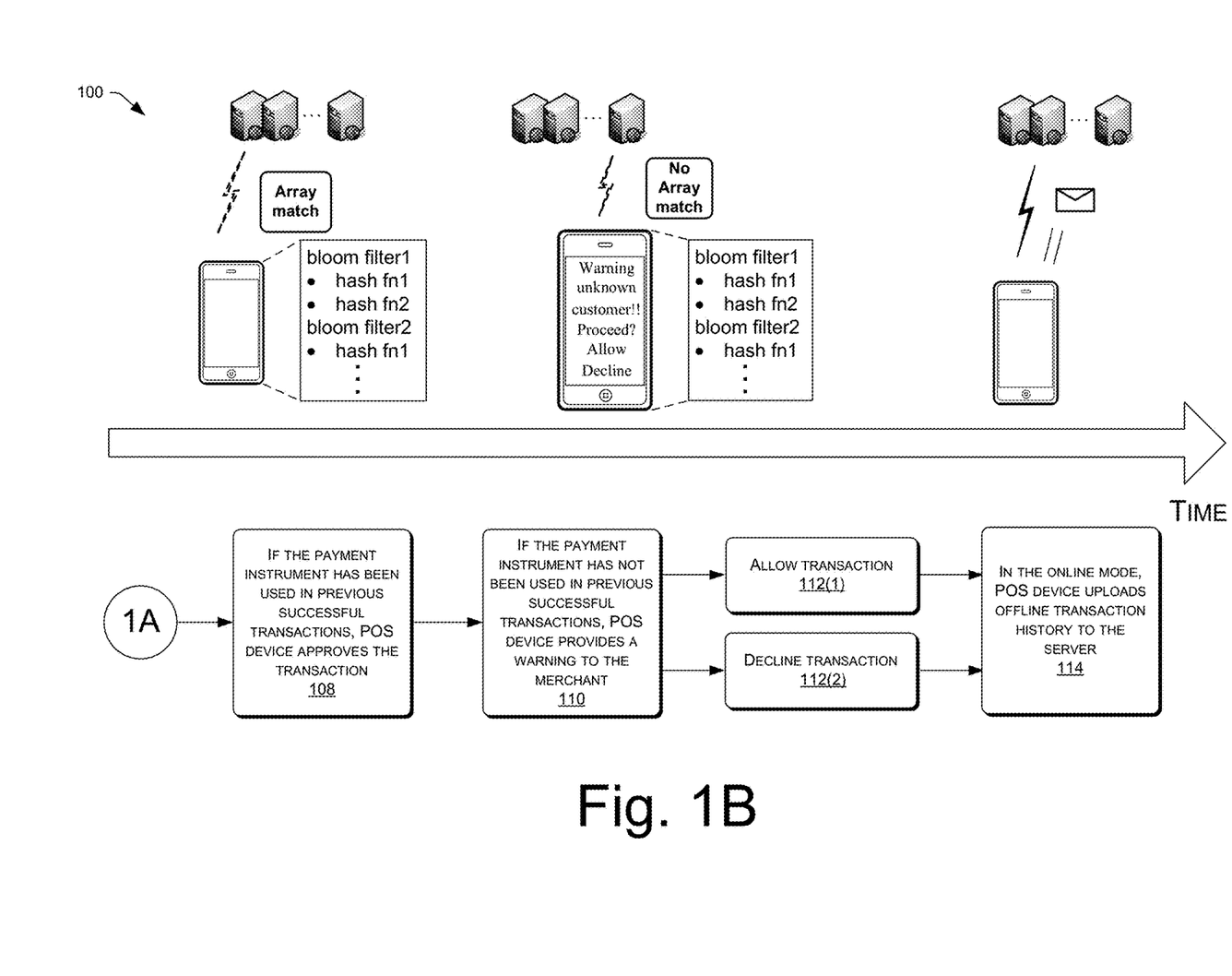

FIGS. 1A-B collectively illustrate a process for risk management in transactions occurring on a point-of-sale (POS) device when the device is in an offline mode.

FIG. 1A illustrates, at 102, a POS device receiving, in an online mode, encrypted data associated with previous transactions from a payment service. The payment service may save the encrypted data in a merchant profile on one or more computing devices. In some embodiments, a merchant may modify the respective merchant profile, and may select a set of criteria to be included in the encrypted data. The set of criteria may include, but is not limited to, information regarding prior payment instrument approval (i.e., designating the customer as trusted), customer information, and/or customer payment history. In some embodiments, the encrypted data may include information regarding stolen cards and/or known nefarious customers (i.e. customers who are known to have payments declined).

As depicted at 102, the data may be encrypted using bloom filters with hash functions. The bloom filter may use the hash functions to determine information about a customer without the risk of the customer's payment instrument identifier being stolen or otherwise used in a nefarious manner (e.g., through reconstruction). In various embodiments, the hash functions hash or map the customer's payment instrument identifier (i.e., an element) to designated array positions of a bloom filter array to test whether the criterion is met (i.e., a positive match occurs when all of the mapped-to array positions have a value of one "1"; no match occurs, and the criterion is not met, if any of the array positions contain a zero ("0")). In some embodiments, the payment instrument identifier may be truncated to a number less than the standard 16 or 17-digit identifier number. For example, the hash functions may truncate a payment instrument identifier to a 10-digit number, and map the 10-digit number to the bloom filter array. Though bloom filters with hash functions are described herein, it is imagined that the other encryption techniques may be used to maintain the security of customer information, such as hash tables, simple arrays, and the like.

In various embodiments, the POS device may incorporate a plurality of bloom filters, each designated to determine if a customer meets one or more criteria of a particular merchant. The criteria may be based on transaction history, customer data, and/or customer history. For example, a bloom filter and/or hash function may be designated to determine that a customer is a member of a merchant loyalty program (e.g., a frequent buyer reward program). In some embodiments, the POS device may incorporate one bloom filter (for a particular merchant) with one or more hash functions, each hash function configured to determine if the payment instrument identifier and/or customer satisfies one or more criteria. Each bloom filter may be sized based upon the merchant profile of the particular merchant.

In various embodiments, the size of a bloom filter (i.e., size of the array and number of hash functions) may be determined based upon a false positive tolerance. In such embodiments, the false positive tolerance may be a factor of the importance of each criterion. Thus, the more important the criterion, the lower the tolerance for a false positive.

In various embodiments, the merchant and/or payment service may designate a tolerance by inputting a probability percentage for false positives (i.e., a merchant will tolerate a 1% chance of a false positive). The tolerance may be set for all bloom filters in a merchant profile, or it may be set per criterion. For example, a bloom filter designated to determine whether a payment instrument identifier of a customer is associated with a customer loyalty program may be sized such that the probability of a false positive is relatively high (i.e., >1%). Whereas a bloom filter designated to determine if a payment instrument identifier is associated with a fraudulent transaction may be sized for a low probability of false positives (i.e., <1%).

In various embodiments, the POS device may comprise at least a merchant application for processing transactions. The merchant application may receive and store data from the merchant profile. In some embodiments, the merchant application may process and save transaction data locally on the POS device.

At 104, the POS device transitions from the online mode to an offline mode. While operating in the offline mode, a merchant may swipe a payment instrument, or otherwise input payment instrument information, into the POS device in order to process a transaction.

At 106, the POS device determines if the customer and/or payment instrument is associated with a previous successful transaction. In various embodiments, the POS device may use a bloom filter with a hash function to make the determination. In such an embodiment, the hash functions in the bloom filter may map or hash a payment instrument identifier to an array stored in the bloom filter to determine if the payment instrument identifier has (most likely) been used in a previous successful transaction. One skilled in the art understands that a bloom filter may have a false positive result. Thus, if the payment instrument identifier matches to all ones "1's" in the bloom filter array, the probability is high that the payment instrument has been used in a previous successful transaction. As previously discussed, the false positive rate may be managed by optimizing the size of the bloom filter.

FIG. 1B continues the illustration of the process 100 and, at 108, the bloom filter determines if the payment instrument has (most likely) been used in a previous successful transaction. The bloom filter may make the determination by matching the payment instrument with positions in a bloom filter array, the positions being associated with one or more payment instruments. Responsive to determining a match, the bloom filter may recognize that the payment instrument has (most likely) been used in a previous successful transaction, and may thus may recognize the customer as a trusted customer. The POS device may then provide an indication to the merchant that the customer is a trusted customer.

In various embodiments, responsive to recognizing the customer as a trusted customer, the POS device may automatically proceed with the transaction. In some embodiments, the POS device may provide, via a graphical user interface (GUI), an option for the merchant to select either proceeding with or cancelling the transaction. For each transaction, the POS device may store the transaction data (i.e., date, time, amount of the transaction, item(s) purchased, etc.), payment instrument information, customer data, and any other relevant information.

FIG. 1B illustrates, at 110, the bloom filter determining there is no match between the payment instrument identifier and the array stored in the bloom filter (i.e., at least one position the payment instrument identifier is mapped to contains a zero "0"). Responsive to the determination that there is no match, the POS device may inform the merchant that the payment instrument has not been used in a previous successful transaction with the merchant. In various embodiments, responsive to determining there is no match, the POS device may designate the customer as an untrusted customer, and/or may warn the merchant of the increased risk in processing transactions with the customer while offline.

In the illustrative example, the POS device may provide, via a graphical user interface (GUI), an option for the merchant to proceed with or to cancel the transaction. In such examples, the merchant may choose to accept the risk of an unsuccessful transaction. In some examples, the POS device may automatically cancel the transaction.

Responsive to allowing a transaction with no match to occur, the POS device may flag the transaction as risky. Additionally, the POS device may store the transaction data (i.e., risky purchase, date, time, amount of the transaction, item(s) purchased, payment instrument information, customer data, etc.).

At 112, the POS device transitions from the offline mode to the online mode. Responsive to establishing connectivity, the POS device may send, to the payment service, the stored transaction data. The payment service may request approval for the transactions that occurred while in the offline mode. The payment service may also update the merchant profile with the transaction data, and may add new trusted customers, and the respective customer information, for subsequently approved transactions and/or customer information for subsequently declined transactions.

In various embodiments, the POS device may, while operating in the online or offline mode, generate one or more bloom filters, each with a plurality of hash functions and at least one array. In such embodiments, the merchant may input one or more payment instrument identifiers (i.e., elements) associated with one or more customers into the POS device. Responsive to the input of a payment instrument identifier, the plurality of hash functions of a bloom filter may save the payment instrument identifier by mapping or hashing the payment instrument identifier to an array (i.e., changing the mapped-to array positions to "1"). One skilled in the art understands that when the payment instrument identifier is saved in a bloom filter, it will recognize the payment instrument identifier in subsequent transactions.

In various embodiments, the locally generated bloom filter may be stored in and accessed by the POS device. In some embodiments, the bloom filter generated by the POS device may be uploaded to the merchant profile maintained by the payment service, and used to augment the one or more bloom filters provided by the payment service.

Figure 2:
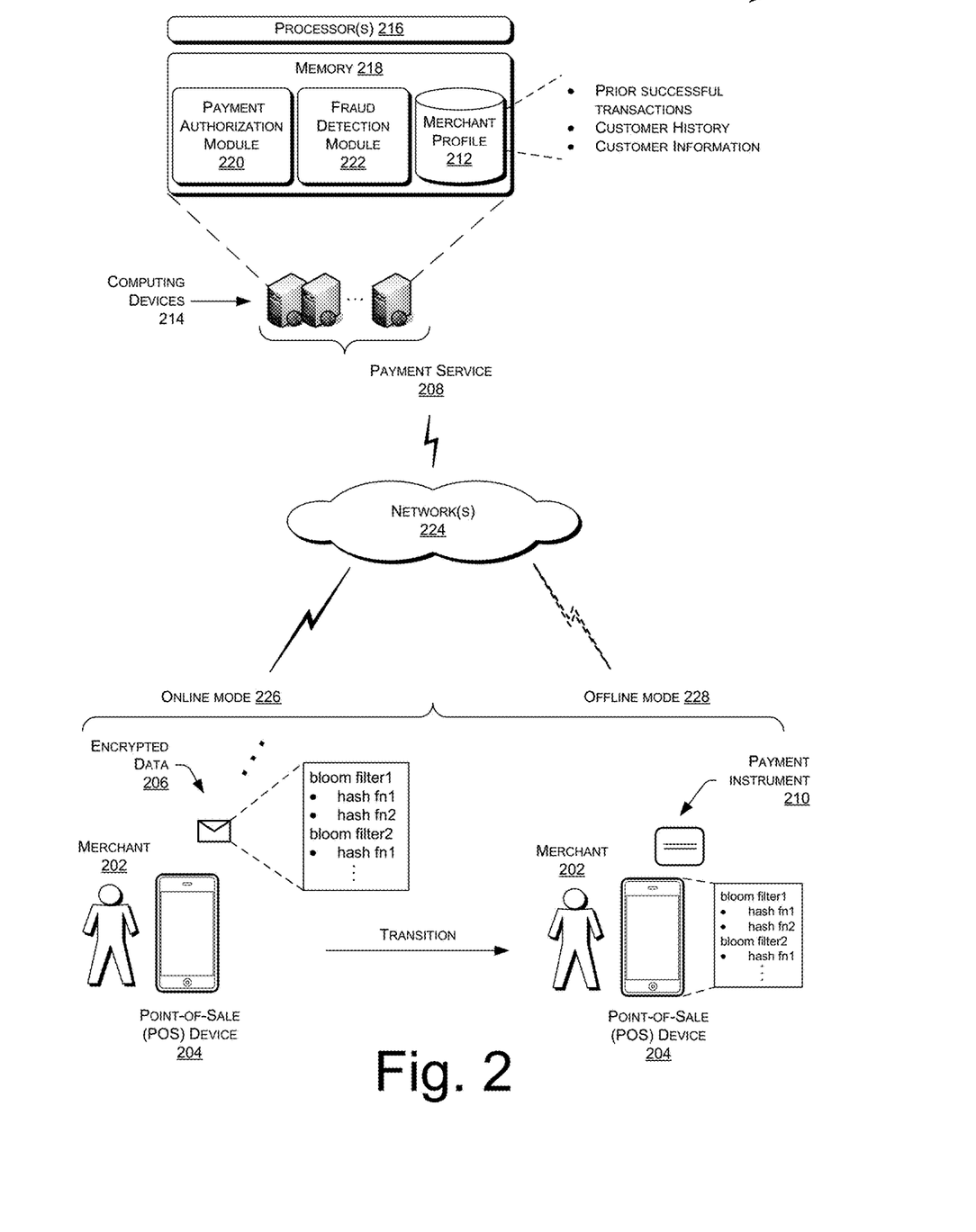
FIG. 2 illustrates an example environment that includes a merchant operating a mobile point-of-sale (POS) device to receive encrypted data associated with multiple payment instruments previously used in successful transactions, when the POS device is in an online mode. The POS device, in either the online or an offline mode, may compare a payment instrument identifier in a transaction to the encrypted data to determine if the payment instrument has been used in previous successful transactions. If there is no match between the payment instrument identifier and the encrypted data, the POS device may warn the merchant of an increased risk in processing the transaction.

FIG. 2 illustrates an example environment that includes a merchant 202 operating a mobile point-of-sale (POS) device 204 to process transactions. The POS device 204 may receive encrypted data 206 from a payment service 208, and may use the encrypted data 206 to reduce the risk of fraudulent transactions.

The POS device 204 may comprise any sort of mobile or non-mobile device that includes an instance of a merchant application that executes on the respective device. The merchant application may provide POS functionality to the POS device 204 to enable the merchant 202 (e.g., an owner, employees, individual user, etc.) to accept payments from the customers. In some types of businesses, the POS device 204 may correspond to a store or other place of business of the merchant, and thus, may be a fixed location that typically does not change on a day-to-day basis. In other types of businesses, however, the POS device 204 may change from time to time, such as in the case that the merchant operates a food truck, is a street vendor, a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of goods and/or services that is conducted between a customer and a merchant. In an example of a legitimate customer/merchant transaction, when paying for a transaction, the customer may provide the amount that is due to the merchant using a payment instrument 210 (e.g., a debit card, a credit card, a stored-value or gift card, a check, through an electronic payment application on a device carried by the customer, or the like). The merchant can interact with the POS device 204 to process the transaction, such as by inputting (e.g., manually, via a magnetic card reader or an RFID reader, etc.) an identifier associated with the payment instrument 210. For example, a payment instrument of one of the customers may include one or more magnetic strips for providing card and customer information when swiped in a card reader. In other examples, other types of payment cards may be used, such as smart cards having a built-in memory chip, a radiofrequency identification tag, or so forth.

As used herein, encrypted data 206 may include encrypted payment instrument identifiers associated with previous transactions, customer history, and/or customer information. The encrypted data 206 may be stored in one or more bloom filters and encrypted using hash functions. The payment service 208 may periodically send encrypted data 206 to the POS device 204 in one or more bloom filters.

As illustrated, the payment service 208 may store the encrypted data in a merchant profile 212 on one or more computing devices 214. The computing devices 214 may include one or more processors 216, and a memory 218, which may store a payment authorization module 220, a fraud detection module 222, and the merchant profile 212. In various embodiments, the merchant 202 may manage the merchant profile 212, selecting the customer information desired by merchant 202. For example, the merchant may want to know a) if a customer has purchased any goods or services from the merchant in the past, b) if the customer has spent over $1000 with the merchant, and c) if the customer is a member of a merchant loyalty program. In such an example, each one of a, b, and c may be stored in one or more bloom filters with one or more hash functions.

In some implementations, the payment service 208 may also provide the merchant 202 with fraudulent transaction data. Fraudulent transaction data may be stored in the fraud detection module 222, and may include identifiers associated with stolen payment instruments and/or information regarding known nefarious customers (i.e., customers known to have previous unsuccessful transactions, etc.).

In various implementations, payment service 208 may send encrypted data 206 and/or fraudulent transaction data via a network 224, while the POS device 204 is in an online mode 226. The POS device 204 may store the encrypted data 206 and/or fraudulent transaction data in a local memory. In some embodiments, the encrypted data 206 and/or fraudulent transaction data may be stored in association with one or more applications on the POS device 204. The POS device may access the encrypted data 206 and/or fraudulent transaction data while the POS device is operating in the online mode 226, or in an offline mode 228.

During a transaction, the POS device 204 may receive an identifier associated with a payment instrument 210. In various embodiments, the POS device 204 may compute an element for the identifier. For example, the POS device may truncate a payment instrument identifier from a 16 or 17-digit number to a 10-digit element. The POS device 204 may apply the payment instrument identifier or the element to the encrypted data 206 (bloom filter arrays) to determine if there is a match. If there is a match between the payment instrument identifier or the element and the encrypted data 206, the merchant may know the customer is a returning customer (i.e., the payment instrument has been used in a previous successful transaction). After determining a match, the POS device 204 may apply the identifier to one or more other bloom filters and/or hash functions to determine additional customer information, such as whether the customer is a member of a loyalty program. The POS device 204 may determine and display the additional customer information as set by the merchant profile 212.

Knowing the payment instrument 210 has been used in previous successful transactions, the merchant may be certain of a decreased risk in a fraudulent transaction with the customer. In various embodiments, while operating the POS device in the offline mode, the POS device may automatically process the transaction if there is bit array match.

If there is no match between the payment instrument identifier and the encrypted data, the merchant 202 may know the customer is not a returning customer. The POS device 204 may provide a warning to the merchant 202, informing the merchant of an increased risk in processing the transaction. In various embodiments, while operating in the offline mode 228, the POS device may provide an option for the merchant 202 to proceed with, or cancel, the transaction. In some embodiments, the POS device may automatically cancel the transaction if there is no payment instrument identifier (or element) to bit array match.

In various embodiments with a fraud detection module 222, the POS device may determine a match between payment instrument identifiers associated with fraudulent transactions and the payment instrument used in the particular transaction. If a match exists, the POS device may automatically cancel the particular transaction and/or may provide a warning to the merchant 202.

With each transaction, the POS device may store data describing the transaction, such as the identifier of the payment instrument 210, an amount of payment received from the customer, the item(s) acquired by the customer, a time, place and date of the transaction, and so forth. The POS device 204 may send the transaction information to the payment service 208 over a network 224, either substantially contemporaneously with the conducting of the transaction (in the case of online transactions) or later when the POS device 204 is in the online mode 226 (in the case offline transactions). Responsive to receiving the transaction information, the payment service 208 may update the merchant profile 212 and/or the fraudulent detection module 222.

The POS device 204 may be configured to transition between an online mode 226 and an offline mode 228 (and vice versa) based on an array of different reasons such as a loss of network connectivity or the merchant 202 manually switching the POS device 204 between modes. In the illustrated example, the merchant 202 conducts numerous transactions on the POS device 204 while in the offline mode 214 by swiping or otherwise inputting information regarding respective payment instruments 210.

Figure 3:
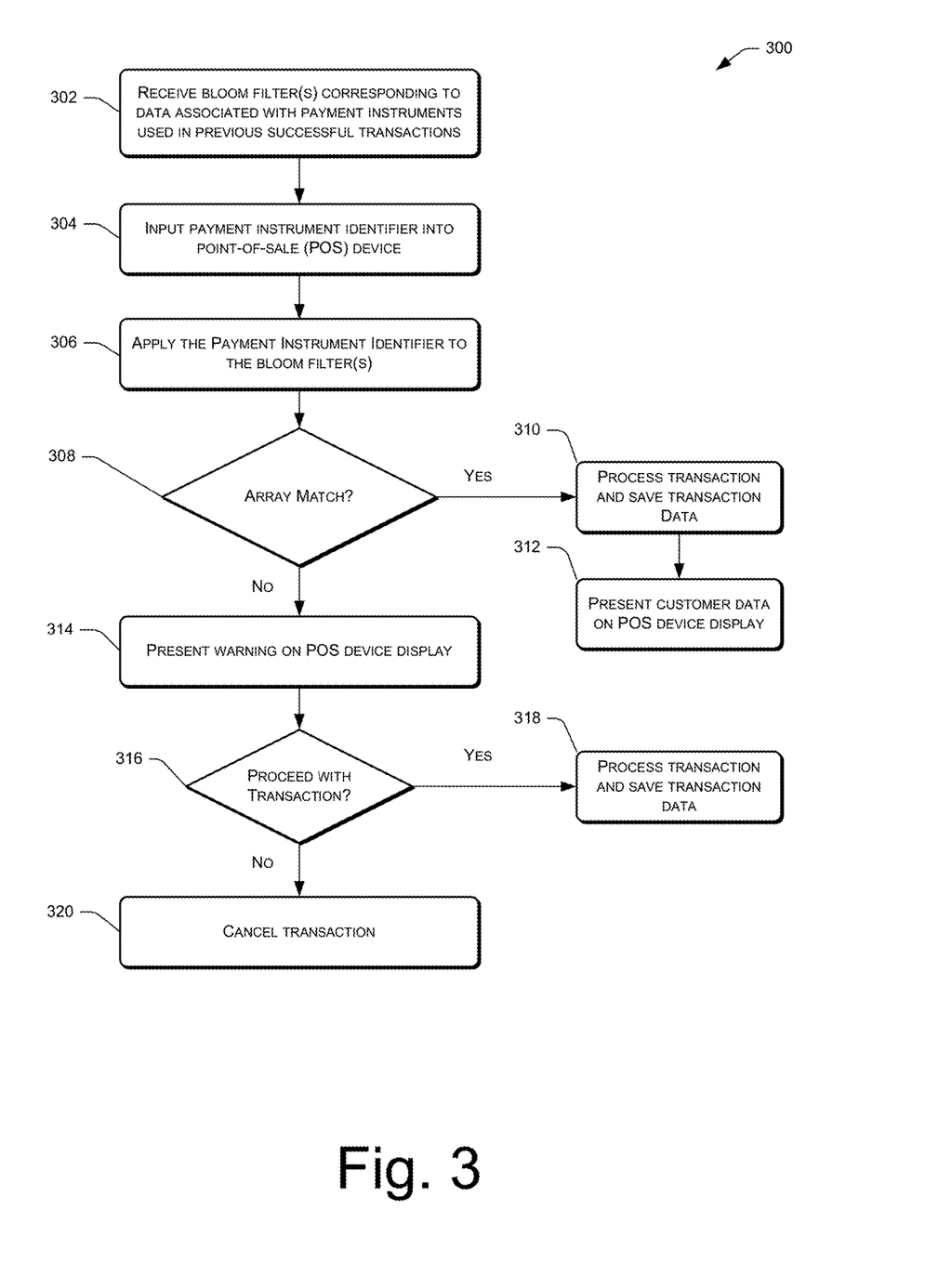
FIG. 3 illustrates a flow diagram of a process for managing risk in offline transactions by verifying the payment instrument is associated with a prior successful transaction. If the payment instrument has not been previously been associated with a successful transaction, the POS device may refrain from processing the current transaction.
Figure 4:
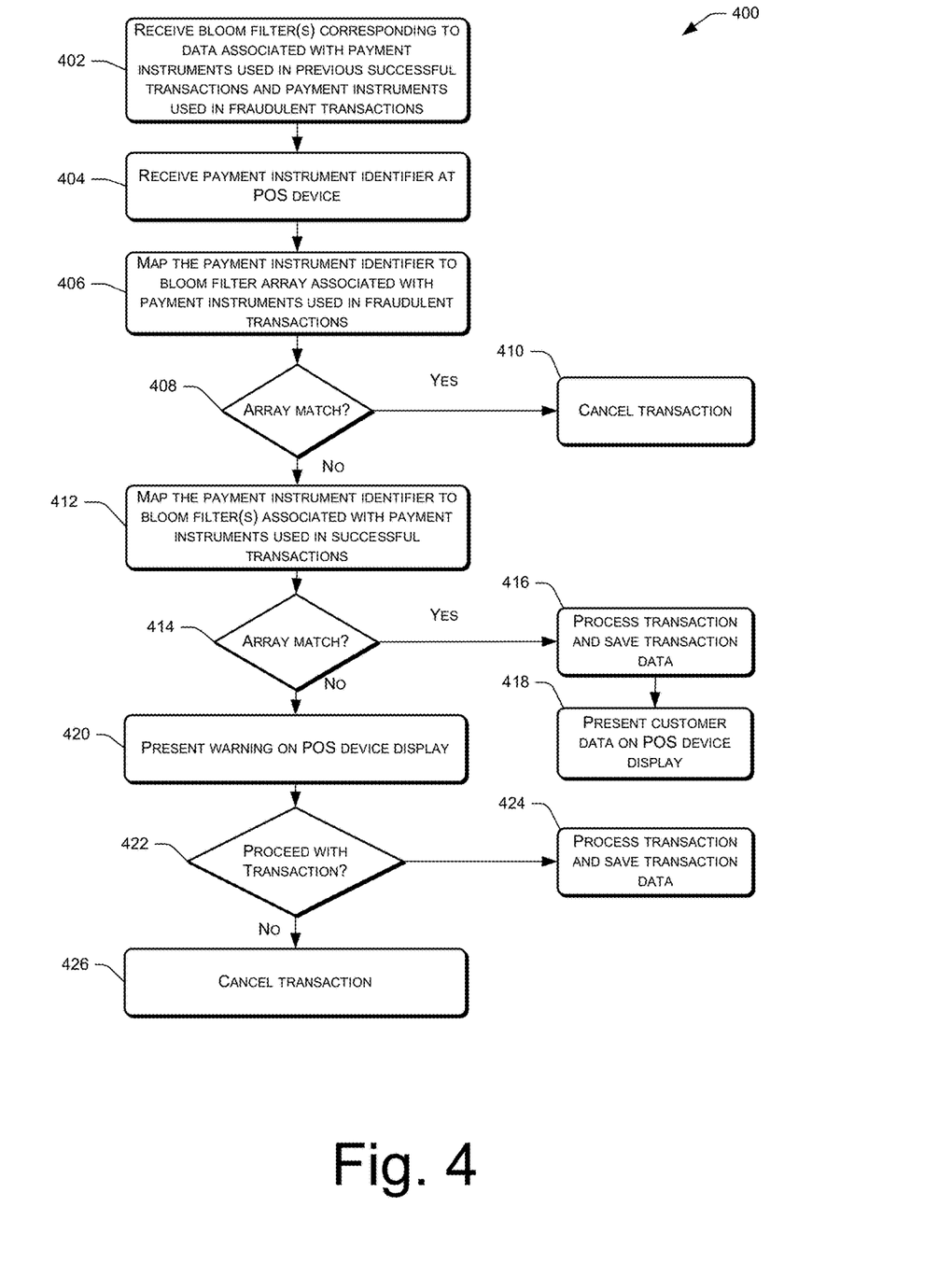
FIG. 4 illustrates a flow diagram of a process for managing risk in payment transactions by ensuring a payment instrument has not been associated with prior fraudulent transactions. If the payment instrument has been associated with a fraudulent transaction, the POS device may refrain from processing the current transaction.

FIGS. 3 and 4 illustrate flow diagrams of processes for managing risk of merchant transactions. Processes 300 and 400 are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

FIG. 3 illustrates a flow diagram of a process 300 for managing risk of merchant transactions by verifying prior successful use of the payment instrument. If the payment instrument has not been previously been associated with a successful transaction, the POS device may refrain from processing the current transaction.

At 302, the process 300 receives encrypted data corresponding to payment instruments used in previous successful transactions. The encrypted data may also include customer data, such as customer information and customer transaction history. In various embodiments, the encrypted data may be transferred in the form of one or more bloom filters, each with one or more hash functions.

At 304, a merchant may input a payment instrument identifier into the POS device. The merchant may input the payment instrument identifier by swiping the payment instrument on a card reader, inserting a smart card device into a smart card reader, or manually entering the identifier via a user interface. The POS device may be operating in an online or an offline mode.

At 306, the process 300 maps the payment instrument identifier (i.e., element) to the bloom filter array to determine if the payment instrument identifier corresponds to a payment instrument which was previously used in a successful transaction. In various embodiments, the POS device may convert the payment instrument identifier into a smaller element. For example, the POS device may truncate the 16 or 17-digit identifier into a 10-digit element. In other embodiments, a larger or smaller element may be used.

At 308, the process 300 determines whether a match exists between the payment instrument identifier and the bloom filter (i.e., all positions the payment instrument identifier is mapped to in the bloom filter array have a value equal to "1"). If a match exists, at 310, process 300 processes the transaction and saves the transaction data. While the POS device is operating in an online mode, the transaction data may be sent to a payment service for payment authorization substantially contemporaneously with the process 300. While the POS device is operating in an offline mode, the transaction data is saved locally on the POS device, for later submission to the payment service for authorization.

At 312, the process 300 may apply merchant-specific criteria to one or more bloom filters to determine customer data. The customer data may include customer information and transaction history with the merchant. The customer data may be selected by the merchant, as designated in a merchant profile. For example, the merchant may want to know if each known customer has recently purchased goods and/or services from a competitor of the merchant.

If no match is determined between the payment instrument identifier and the bloom filter array (at least one position value equals "0"), process 300 presents a warning on the POS device display at 314. The warning may alert the merchant that it is not a returning customer, and to be wary of processing the transaction due to the increased risk in transacting with an unknown customer.

At 316, the process 300 determines whether to proceed with the transaction. While operating in an online mode, process 300 may proceed with the transaction 318 based on a payment authorization from the payment service. While operating in the offline mode, process 300 may provide the merchant an option at 316 to accept the risk of a fraudulent transaction, and proceed with the transaction. If the merchant decides to proceed, the transaction may be processed and data may be saved to the POS device at 318. If not, then at 320, the process 300 cancels the transaction.

FIG. 4 illustrates a flow diagram of a process 400 for managing risk in merchant transactions by ensuring a payment instrument has not been associated with prior fraudulent transactions. If the payment instrument has been associated with a fraudulent transaction, the POS device may refrain from processing the current transaction.

At 402, the process 400 receives encrypted data corresponding to payment instruments used in fraudulent transactions. Process 400 may also receive encrypted data corresponding to payment instruments used in previous successful transactions. The encrypted data associated with successful transactions may also include customer data, such as customer information and customer transaction history. In various embodiments, the encrypted data may be in the form of in one or more bloom filters.

At 404, the process 400 receives a payment instrument identifier. The payment instrument identifier may be input into the POS device by swiping the payment instrument on a card reader, inserting a smart card device into a smart card reader, or manually entering the identifier via a user interface. The POS device may be operating in an online or an offline mode.

At 406, the hash functions in the bloom filter map the payment instrument identifier to an array in the bloom filter, the array corresponding to payment instruments used in fraudulent transactions.

At 408, the process 400 determines whether a match exists between the payment instrument identifier and the array corresponding to payment instruments used in fraudulent transactions. If a match exists, at 410, process 400 may cancel the transaction. At 410, process 400 may provide a notification to the merchant, informing the merchant of a high likelihood of an association between the payment instrument and a prior fraudulent transaction.

If no match is determined between the payment instrument identifier and the array in the bloom filter corresponding to fraudulent transactions, at 412, process 400 maps the payment instrument identifier to one or more arrays in one or more bloom filters associated with payment instruments used in successful transactions.

At 414, the process 400 determines whether a match exists between the payment instrument identifier and the one or more bloom filter arrays associated with successful transactions. If a match exists, at 416, process 400 processes the transaction and saves the transaction data. While the POS device is operating in an online mode, the transaction data may be sent to a payment service for payment authorization substantially contemporaneously with the process 400. While the POS device is operating in an offline mode, the transaction data is saved locally on the POS device, for later submission to the payment service for authorization.

In various embodiments, the process 400 maps the payment instrument identifier to a bloom filter array to determine whether the payment instrument is associated with a previous successful transaction. Responsive to an array match at 414, the process 400 may apply the payment instrument identifier to one or more bloom filters (mapping the identifier to one or more arrays), to determine customer data.

At 418, the process 400 may present the customer data on a POS device display. The customer data may include customer information and transaction history with the merchant. The customer data may be selected by the merchant, as designated on a merchant profile. For example, the merchant may want to know if each customer is a member of a merchant-specific loyalty program and has previously purchased over $1000 worth of goods from the merchant.

If no match is determined between the payment instrument identifier and bloom filter array associated with successful transactions, process 400 presents a notification on the POS device display at 420. The notification may alert the merchant that it is not a returning customer, and to be wary of processing the transaction due to the increased risk in transacting with an unknown customer.

At 422, the process 400 determines whether to proceed with the transaction. While operating in an online mode, process 400 may proceed with the transaction 424 based on a payment authorization from the payment service. While operating in the offline mode, process 400 may provide the merchant an option at 422 to accept the risk of a fraudulent transaction, and proceed with the transaction. If the merchant decides to proceed, the transaction may be processed and data may be saved to the POS device at 424. If not, then at 426, the process 400 may cancel the transaction.

Figure 5:
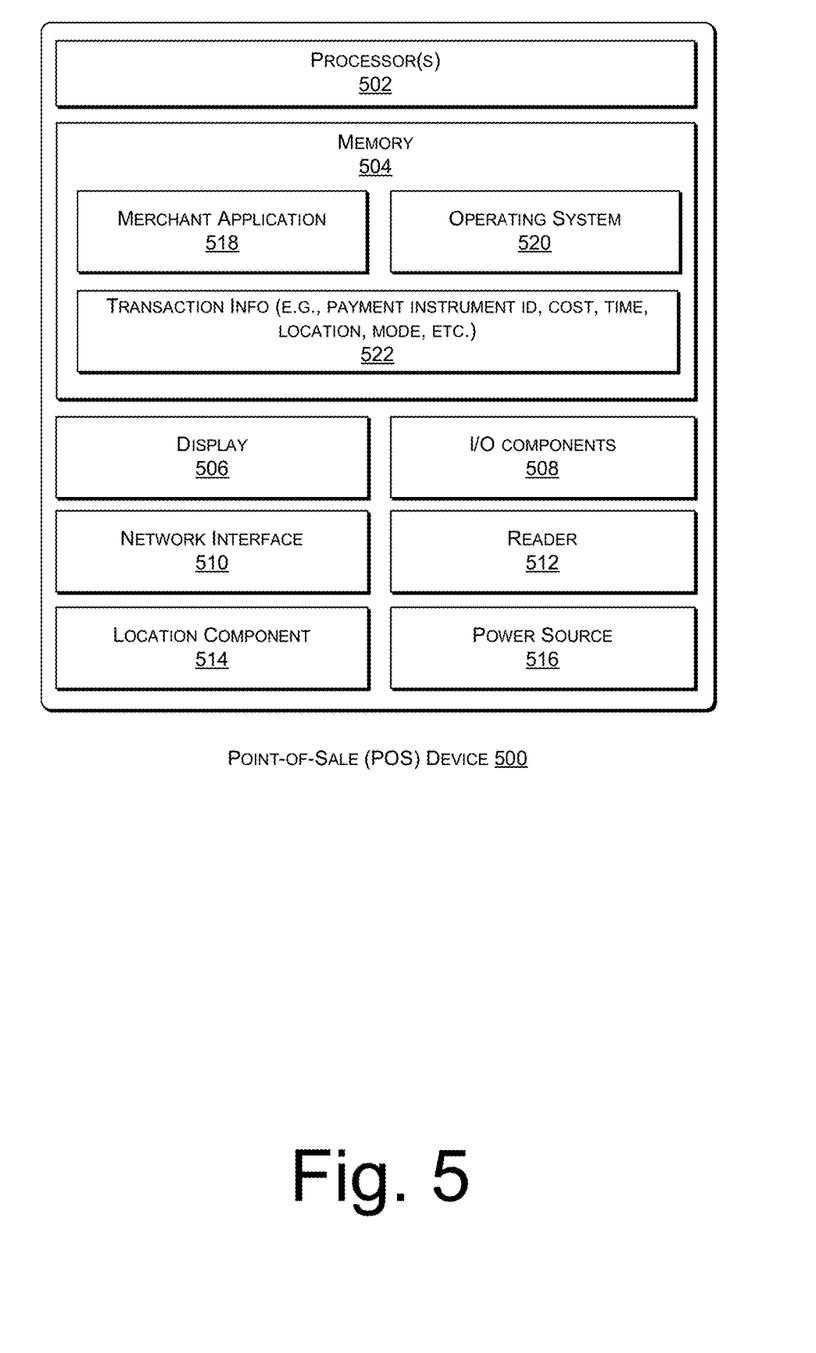
FIG. 5 illustrates select components of a POS device that a merchant described herein may utilize.

FIG. 5 illustrates select example components of an example POS device 500 according to some implementations. The POS device 500 may be any suitable type of computing device, e.g., mobile, semi-mobile, semi-stationary, or stationary. Some examples of the POS device 500 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 500 includes at least one processor 502, at least one memory 504, a display 506, one or more input/output (I/O) components 508, one or more network interfaces 510, at least one card reader 512, at least one location component 514, and at least one power source 516. Each processor 502 may itself comprise one or more processors or processing cores. For example, the processor 502 can be implemented as one or more microprocessors, microcomputers, microcontrollers, digital signal processors, central processing units, state machines, logic circuitries, and/or any devices that manipulate signals based on operational instructions. In some cases, the processor 502 may be one or more hardware processors and/or logic circuits of any suitable type specifically programmed or configured to execute the algorithms and processes described herein. The processor 502 can be configured to fetch and execute computer-readable processor-executable instructions stored in the memory 504.

Depending on the configuration of the POS device 500, the memory 504 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 504 may include, but is not limited to, RAM, ROM, EEPROM, flash memory, solid-state storage, magnetic disk storage, optical storage, and/or other computer-readable media technology. Further, in some cases, the POS device 500 may access external storage, such as RAID storage systems, storage arrays, network attached storage, storage area networks, cloud storage, or any other medium that can be used to store information and that can be accessed by the processor 502 directly or through another computing device or network. Accordingly, the memory 504 may be computer storage media able to store instructions, modules or components that may be executed by the processor 502. Further, when mentioned, non-transitory computer-readable media exclude media such as energy, carrier signals, electromagnetic waves, and signals per se.

The memory 504 may be used to store and maintain any number of functional components that are executable by the processor 502. In some implementations, these functional components comprise instructions or programs that are executable by the processor 502 and that, when executed, implement operational logic for performing the actions and services attributed above to the POS device 500. Functional components of the POS device 500 stored in the memory 504 may include a merchant application 518, discussed above. The merchant application 518 may present an interface on the POS device 500 to enable the merchant to conduct transactions, transition between the offline and online modes, receive payments, generate bloom filters, and so forth, as well as communicating with the payment service 208 for processing payments and sending transaction information. Further, the merchant application 518 may present an interface to enable the merchant to manage a merchant profile 212, a merchant account, and the like. Additional functional components may include an operating system 520 for controlling and managing various functions of the POS device 500 and for enabling basic user interactions with the POS device 500. The memory 504 may also store transaction data 522 that is received based on the merchant associated with the POS device 500 engaging in various transactions with customers. The memory 504 may also store bloom filters generated by the merchant application 518.

In addition, the memory 504 may also store data, data structures and the like, that are used by the functional components. For example, this data may include item information that includes information about the items offered by the merchant, which may include images of the items, descriptions of the items, prices of the items, and so forth. Depending on the type of the POS device 500, the memory 504 may also optionally include other functional components and data, which may include programs, drivers, etc., and the data used or generated by the functional components. Further, the POS device 500 may include many other logical, programmatic and physical components, of which those described are merely examples that are related to the discussion herein.

The network interface(s) 510 may include one or more interfaces and hardware components for enabling communication with various other devices over the network or directly. For example, network interface(s) 510 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 5 further illustrates that the POS device 500 may include the display 506 mentioned above. Depending on the type of computing device used as the POS device 500, the display 506 may employ any suitable display technology. For example, the display 506 may be a liquid crystal display, a plasma display, a light emitting diode display, an OLED (organic light-emitting diode) display, an electronic paper display, or any other suitable type of display able to present digital content thereon. In some examples, the display 506 may have a touch sensor associated with the display 506 to provide a touchscreen display configured to receive touch inputs for enabling interaction with a graphic interface presented on the display 506. Accordingly, implementations herein are not limited to any particular display technology. Alternatively, in some examples, the POS device 500 may not include the display 506, and information may be present by other means, such as aurally.

The I/O components 508, meanwhile, may include speakers, a microphone, a camera, and various user controls (e.g., buttons, a joystick, a keyboard, a keypad, etc.), a haptic output device, and so forth.

In addition, the POS device 500 may include or may be connectable to a payment instrument reader 512. In some examples, the reader 512 may plug in to a port in the merchant device, such as a microphone/headphone port, a data port, or other suitable port. In other instances, the reader 512 is integral with the entire POS device 500. The reader may include a read head for reading a magnetic strip of a payment card, and further may include encryption technology for encrypting the information read from the magnetic strip. Alternatively, numerous other types of card readers may be employed with the POS devices 500 herein, depending on the type and configuration of a particular POS device 500.

The location component 514 may include a GPS device able to indicate location information, or the location component 514 may comprise another other location-based sensor. The POS device 500 may also include one or more additional sensors (not shown), such as an accelerometer, gyroscope, compass, proximity sensor, and the like. Additionally, the POS device 500 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A point-of-sale (POS) device comprising:
a display;
a reader to receive a payment instrument of a customer of a merchant;
one or more processors; and
one or more computer-readable media storing instructions executable by the one or more processors, wherein the instructions program the one or more processors to perform acts comprising:
conducting, via the POS device and using the payment instrument, a previous transaction between the customer and the merchant, wherein the payment instrument is associated with an identifier;
sending, to a payment service, the identifier and data indicating that the payment instrument associated with the identifier was used to conduct the previous transaction with the merchant;
receiving, from the payment service while the POS device operates in an online mode, at least one bloom filter generated based at least in part on the identifier and the data, the at least one bloom filter defining:
a plurality of hash functions; and
an array comprising multiple positions, the array representing the identifier of the payment instrument used to conduct the previous transaction between the customer and the merchant;
storing the at least one bloom filter;
receiving, from the reader while the POS device operates in an offline mode, the identifier of the payment instrument for satisfying a cost of a current transaction between the merchant and the customer;
determining that the POS device is operating in the offline mode;
mapping, using the plurality of hash functions and based at least in part on determining that the POS device is operating in the offline mode, the identifier of the payment instrument to the array;
determining that the identifier of the payment instrument matches respective positions in the array;
based at least in part on determining that the identifier of the payment instrument matches the respective positions in the array:
presenting, on the display, an indication that the customer has previously transacted with the merchant; and
storing the identifier of the payment instrument and an indication of the cost of the current transaction;
switching from operating in the offline mode to operating in the online mode; and
sending, based at least in part on switching from operating in the offline mode to operating in the online mode, the identifier of the payment instrument and the indication of the cost of the current transaction to the payment service for authorizing the payment instrument for the cost of the current transaction.

2. The POS device as claim 1 recites, the acts further comprising presenting on the display, based at least in part on determining that the identifier of the payment instrument matches the respective positions in the array, information associated with the customer.

3. The POS device as claim 1 recites, wherein the indication comprises a first indication, and the acts further comprising presenting on the display, based at least in part on determining that the identifier of the payment instrument matches the respective positions in the array, a second indication that the payment instrument of the customer has previously been declined.

4. The POS device as claim 1 recites, wherein the customer comprises a first customer, and the acts further comprising:
receiving, while the POS device operates in the offline mode, a second identifier of a second payment instrument of a second customer for satisfying a second cost of a second transaction between the merchant and the second customer;
mapping, using the plurality of hash functions, the second identifier of the second payment instrument of the second customer to the array;
determining that the second identifier of the second payment instrument of the second customer does not match respective positions in the array; and
providing a selectable option to proceed with the second transaction.

5. One or more non-transitory computer-readable media storing computer-executable instructions that, when executed, cause one or more processors to perform acts comprising:
receiving, from a payment service, while a merchant device is operating in an online mode, at least one bloom filter, the at least one bloom filter defining:
a plurality of hash functions;
an array comprising multiple positions and representing at least one identifier of at least one payment instrument that a respective customer previously used to conduct a transaction with a merchant; and
a false positive tolerance associated with a payment criterion;
storing the at least one bloom filter;
receiving, while the merchant device is operating in an offline mode, an identifier of a payment instrument of a customer for satisfying a cost of a current transaction between the merchant and the customer;
determining that the merchant device is operating in the offline mode;
mapping, using the plurality of hash functions and based at least in part on determining that the merchant device is operating in the offline mode, the identifier of the payment instrument to the array;
determining that the identifier of the payment instrument matches respective positions in the array, the determining indicating that the identifier of the payment instrument satisfies the false positive tolerance;
processing, based at least in part on the identifier of the payment instrument satisfying the false positive tolerance, the current transaction; and
storing the identifier of the payment instrument.

6. The one or more non-transitory computer-readable media as claim 5 recites, the acts further comprising:
switching from operating in the offline mode to operating in the online mode,
and wherein processing the current transaction comprises sending the identifier of the payment instrument and an indication of the cost of the current transaction to the payment service for authorizing the payment instrument for the cost of the current transaction.

7. The one or more non-transitory computer-readable media as claim 5 recites, the acts further comprising causing presentation of information associated with the customer, wherein the information associated with the customer has been previously selected to be displayed by the merchant.

8. The one or more non-transitory computer-readable media as claim 5 recites, the acts further comprising causing presentation of an indication that the payment instrument has previously been declined.

9. The one or more non-transitory computer-readable media as claim 5 recites, the acts further comprising:
receiving, while the merchant device is operating in the online mode, an additional identifier of an additional payment instrument of an additional customer for satisfying a cost of an additional transaction between the merchant and the additional customer; and
sending, to the payment service for authorizing the additional payment instrument for the cost of the additional transaction, the additional identifier of the additional payment instrument and the indication of the cost of the additional transaction.

10. The one or more non-transitory computer-readable media as claim 5 recites, the acts further comprising:
receiving, while the merchant device is operating in the offline mode, an additional identifier of an additional payment instrument of an additional customer for satisfying a cost of an additional transaction between the merchant and the additional customer;
mapping, using the plurality of hash functions, the additional identifier of the additional payment instrument of the additional customer to the array;
determining that the additional identifier of the additional payment instrument of the additional customer does not match respective positions in the array; and
providing a selectable option to proceed with the additional transaction.

11. The one or more non-transitory computer-readable media as claim 5 recites, wherein:
the merchant device is configured to communicate with the payment service via a network connection while the merchant device is operating in the online mode; and
the merchant device is not configured to communicate with the payment service via the network connection while the merchant device is operating in the offline mode.

12. The one or more non-transitory computer-readable media as claim 5 recites, wherein the at least one bloom filter comprises a first bloom filter, the array comprises a first array, the false positive tolerance comprises a first false positive tolerance, the payment criterion comprises a first payment criterion, and the acts further comprising:
receiving, from the payment service, a second bloom filter defining a second array and a second false positive tolerance associated with a second payment criterion;
mapping the identifier of the payment instrument to the second array; and
determining that the identifier of the payment instrument matches respective positions in the second array, the determining indicating that the identifier of the payment instrument satisfies the second false positive tolerance.

13. A merchant device comprising:
one or more processors; and
one or more computer-readable media storing instructions executable by the one or more processors, wherein the instructions program the one or more processors to perform acts comprising:
receiving, from a payment service while operating in an online mode, at least one bloom filter, the at least one bloom filter defining:

a plurality of hash functions;
an array comprising multiple positions and representing at least one identifier of at least one payment instrument that a respective customer previously transacted with a merchant; and
a false positive tolerance associated with a payment instrument criterion;

storing the at least one bloom filter;
receiving, while operating in an offline mode, an identifier of a payment instrument of a customer for satisfying a cost of a current transaction between the merchant and the customer;
mapping, using the plurality of hash functions and based at last in part on operating in the offline mode, the identifier of the payment instrument of the customer to the array;
determining that the identifier of the payment instrument matches respective positions in the array, the determining indicating that the identifier of the payment instrument satisfies the false positive tolerance;
processing, based at least in part on the identifier of the payment instrument satisfying the false positive tolerance, the current transaction; and
storing the identifier of the payment instrument.

14. The merchant device as claim 13 recites, the acts further comprising:
switching from operating in the offline mode to operating in the online mode,
and wherein processing the current transaction comprises sending the identifier of the payment instrument and an indication of the cost of the current transaction to the payment service for authorizing the payment instrument for the cost of the current transaction.

15. The merchant device as claim 13 recites, the acts further comprising causing presentation of information associated with the customer, wherein the information associated with the customer has been previously selected to be displayed by the merchant.

16. The merchant device as claim 13 recites, the acts further comprising:
receiving, while operating in the online mode, an additional identifier of an additional payment instrument of an additional customer for satisfying a cost of an additional transaction between the merchant and the additional customer; and
sending the additional identifier of the additional payment instrument and the indication of the cost of the additional transaction to the payment service for authorizing the additional payment instrument for the cost of the additional transaction.

17. The merchant device as claim 13 recites, the acts further comprising:
receiving, while operating in the offline mode, an additional identifier of an additional payment instrument of an additional customer for satisfying a cost of an additional transaction between the merchant and the additional customer;
mapping, using the plurality of hash functions, the additional identifier of the additional payment instrument of the additional customer to the array;
determining that the additional identifier of the additional payment instrument of the additional customer does not match respective positions in the array; and
providing a selectable option to proceed with the additional transaction.

18. The merchant device as claim 13 recites, wherein:
the merchant device is configured to communicate with the payment service via a network connection while operating in the online mode; and
the merchant device is not configured to communicate with the payment service via the network connection while operating in the offline mode.

19. The merchant device as claim 13 recites, wherein the payment instrument criterion is associated with a customer loyalty program, and wherein determining that the identifier of the payment instrument matches respective positions in the array indicates that the customer is associated with the loyalty program.

20. The merchant device as claim 13 recites, wherein the payment instrument criterion is associated with a fraudulent transaction indication, and wherein determining that the identifier of the payment instrument matches respective positions in the array indicates that the payment instrument is not associated with the fraudulent transaction indication.

* * * * *